United States Patent [19]
Pipa

[11] 3,733,741
[45] May 22, 1973

[54] CHILD'S MUSICAL TOY

[75] Inventor: William J. Pipa, New Hyde Park, N.Y.

[73] Assignee: Dicker International, Inc., New York, N.Y.

[22] Filed: Apr. 30, 1971

[21] Appl. No.: 139,046

[52] U.S. Cl..............................46/175 AR, 200/82 R
[51] Int. Cl. ................................................A63h 5/00
[58] Field of Search ................46/175, 175 AR, 232; 200/82 R

[56] References Cited
UNITED STATES PATENTS

| | | | |
|---|---|---|---|
| 3,550,495 | 12/1970 | Shotmeyer | 46/232 UX |
| 3,523,388 | 8/1970 | Glass et al. | 46/175 AR |
| 2,159,419 | 5/1939 | Bearss et al. | 200/82 R |

*Primary Examiner*—Louis G. Mancene
*Assistant Examiner*—Robert F. Cutting
*Attorney*—George Gottlieb, Michael I. Rackman, James Reisman et al.

[57] ABSTRACT

A child's toy musical instrument simulating the form of a real wind instrument and incorporating a battery-operated toy phonograph, including a grooved record on which music played on the real instrument is reproduced. The body of the toy includes a tube portion with a mouth piece at one end and a plug slidable within the tube under the pressure of air blown into it through the mouth piece. The electrical circuit of the phonograph includes a normal open switch positioned to be closeable by the plug when moved under pressure of breath blown into the mouth piece.

11 Claims, 3 Drawing Figures

PATENTED MAY 22 1973 3,733,741

WILLIAM J. PIPA
INVENTOR.

BY
ATTORNEY

CHILD'S MUSICAL TOY

The present invention relates to a child's toy and, more specifically, to a child's musical toy simulating a wind instrument and capable of re-producing a musical tune, such as could be produced on the real instrument, by following the normal procedure of blowing into said instrument.

Numerous children's musical toys have heretofore been known which could be operated by a child to produce a musical tune. These include toys in which a sound-producing device may be operated by manually or electrically effected compression of a sound-producing device associated with the toy. They also include toy devices containing a toy phonograph and a grooved record which may be manually or mechanically or electrically operated for playing the record. However, to applicant's knowledge, there has never been available for a child, a toy simulating a wind instrument by means of which the child could, by blowing into the instrument, reproduce a musical tune or composition such as might be played on the real instrument which the toy simulates.

Generally stated, the invention contemplates the provision of a toy in the form and shape of a wind instrument, such as any type of horn, saxophone or the like, having provision for the positioning therein or thereon of a battery-operated toy phonograph mounting a record on which a tune produced by the real instrument is recorded; the phonograph being connected in circuit with a battery and containing a switch which is arranged to close the electric circuit through the phonograph by blowing into the mouth piece of the toy instrument.

It is an object of the present invention to provide a musical toy of the character described which may closely simulate the shape and form of a real wind instrument to afford a child using it the feeling and enjoyment of blowing the real instrument and of listening to a tune played by it.

It is another object of the present invention to provide a child's musical toy of the character described which is strong and sturdy and substantially fool-proof in its operation.

It is still another object of the present invention to provide a musical toy of the character described which may reproduce relatively long musical tunes, to enhance the pleasure of the child using the instrument.

It is a further object of the present invention to provide a child's toy musical instrument of the character described which permits ready access for replacement of the phonograph actuating battery.

The foregoing and other objects and advantages of the child's musical toy of the present invention will become more readily apparent to those skilled in the art from the embodiment thereof shown in the accompanying drawing and from the related description following. It will be understood, however, that such embodiment is shown by way of illustration only, to make the principles and practice of the invention more readily comprehensible and without any intent of limiting the invention to the specific details therein shown.

Figure 1:
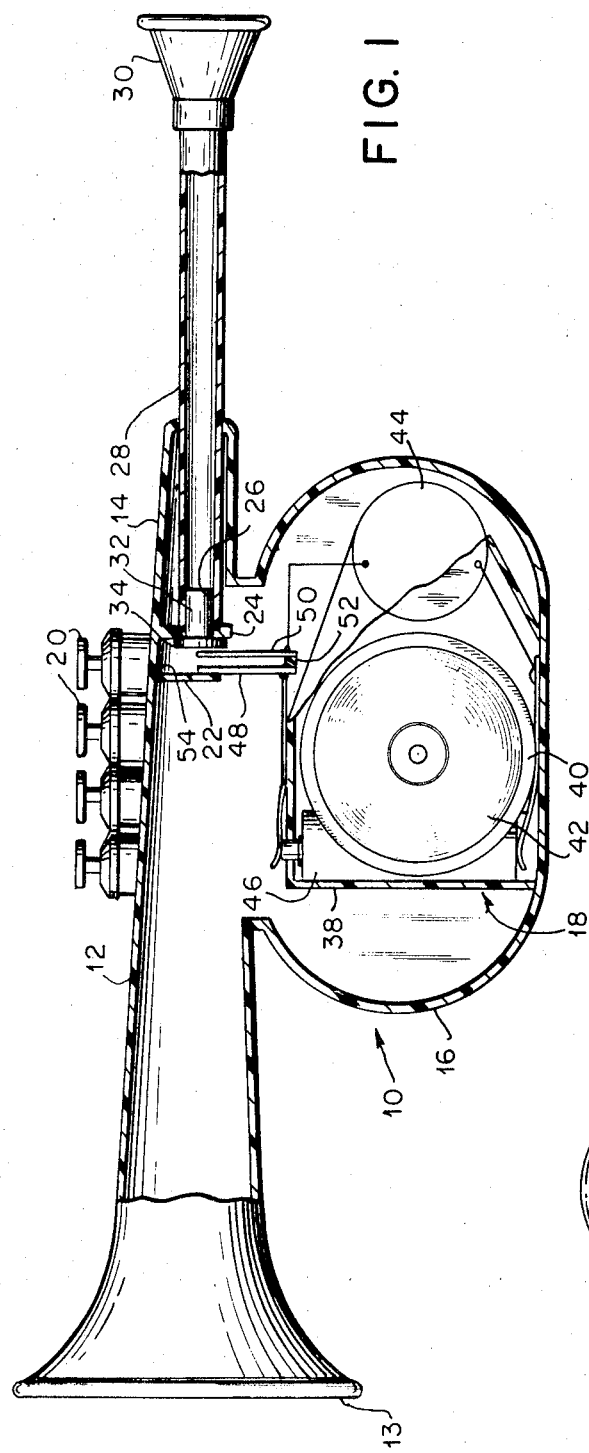
FIG. 1 is a more or less schematic side elevational and partly sectional view of a toy wind instrument embodying the present invention, showing the instrument at rest.

Referring now in greater detail to the embodiment of the invention, more or less schematically illustrated in the drawings, the same is shown to be in the form of a horn, generally designated as 10, including a tubular part, 12 flared at one end as at 13, in simulation of a conventional horn and having a reduced tubular portion 14, at its other end and a depending hollow portion 16, forming a housing for a toy phonograph, generally designated as 18. Tubular portion 12 may be provided with upwardly projecting studs 20 in simulation of conventional horn stops.

Tubular section 12 may be provided with depending spaced, preferably parallel, depending inner and outer plates 22 and 24 respectively, the outer one 24 of which may be provided with an opening, 26, which is formed with a rabbet 27 in its outwardly facing edge.

The toy instrument 10 is also provided with a tubular section, 28, in simulation of the reed-holding portion of a horn, formed with a mouth piece, 30, at one end, and whose other end is telescopically inserted into tubular section 14 and engages into the rabbet 27 of opening 26 of the outer depending plate 24. A plug, 32, having an enlarged head, 34, is snugly but slideably set into the inner end of the tubular section 28, through the opening 26 of plate 24, with the head 34 disposed in the space 36 between plates 22 and 24.

The toy phonograph 18 may be of a battery-operated type, a number of which are known in the art and are available on the market. In such battery-operated toy phonographs, the battery actuates an electric motor that rotates a turntable on which a grooved record is mounted. A stylus is normally in contact with the record at the peripheral end of the groove and, when the turntable rotates follows the groove to its inner end when it is automatically returned to initial position. The phonograph 18 may be held in the housing 16 in any desired manner and by any desired means. As such manner and means for securing the phonograph within the housing may be varied and is not deemed to constitute a feature of the present invention, specific details thereof are not thought necessary to be illustrated.

The phonograph 18 is shown to include a housing, 38, containing a turntable, 40, a grooved disk record, 42, mounted on the turntable, and an electric motor, 44, connected in circuit with a battery, 46, disposed within the housing 16. The speaker and stylus of the invention and the automatic means for returning the stylus to initial position are not shown, for simplification of illustration.

Figure 2:
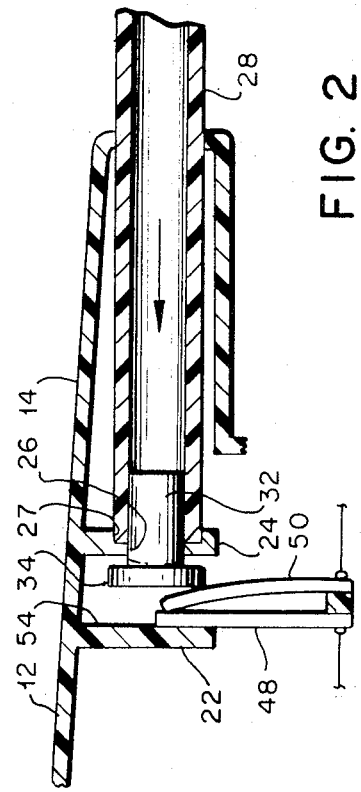
FIG. 2 is a fragmentary sectional view, on an enlarged sketch, showing the instrument as activated to play a tune.

The circuit of the motor 44 includes a normally open switch comprising a pair of spaced switch bars, 48 and 50, each secured by one end in the circuit, in insulated relation to the other, as at 52, with their other ends extending into space, 54, between plates 22 and 24 of horn section 12, as clearly shown in FIGS. 1 and 2 of the drawings. Bars 48 and 50 are normally disposed in parallel, non-contacting relation as illustrated in FIG. 1, and at least one of the bars, as 50, closest to the plug 32, is resilient and capable of being bent to be brought into contact with the companion switch bar 48 to close the circuit through the switch and through motor 44; as illustrated in FIG. 2 of the drawings.

In operation, a child blowing into the horn through the mouth piece 30, causes plug 32 to move inwardly against the resilient switch bar 50 to bring it into contact with the companion switch bar 48 and thereby close the circuit through the motor 44. Actuation of motor 44 initiates the rotation of the turntable 40 and record 42. The stylus, following the groove of the record, will bring about a reproduction of the tune recorded thereon.

As long as the child continues to blow into the mouth piece 30, the switch will remain closed and the motor will continue to rotate the turntable and the stylus will continue to repeatedly play the record; automatically returning to initial position each time it reaches the end of the record groove. When the child ceases to blow into the mouthpiece, switch bar 50 will resiliently return to upright position to break the circuit to the motor and to stop the operation of the toy phonograph; simultaneously pushing plug 32 rearwardly into the tube 28.

Figure 3:
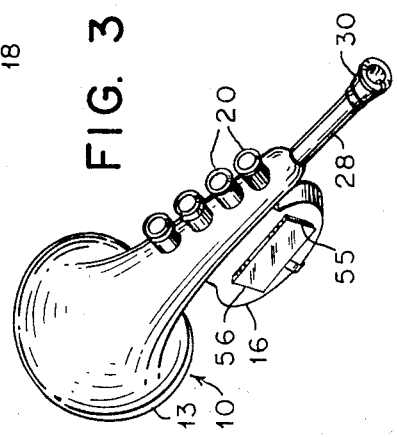
FIG. 3 is a perspective view of the instrument, on a reduced scale.

Phonograph housing 16 may be provided with an opening, 55, closeable by a closure, 56, as more or less schematically indicated in FIG. 3, from which a spent battery 46 may replaced or a record 42, if replaceable, may be changed.

This completes the description of the toy musical instrument of the present invention. It will be readily apparent that the body of such toy may be readily and economically produced as by molding from synthetic plastic material as illustrated, or by stamping out of metal, and that such body may be relatively, simply and easily assembled with a battery-operated toy phonograph of any standard type. It will also be apparent that such toy musical instrument will be relatively sturdy and durable. It will be additionally apparent that such toy musical instrument simulates a real instrument of similar king, both in appearance and in the sound produced thereon, to thereby greatly enhance the interest, pleasure and enjoyment of a child using the toy.

It will be further apparent that numerous variations and modifications may be made in the child's toy musical instrument of the present invention, by anyone skilled in the art, in accordance with the principles of the invention hereinabove set forth and without the exercise of any inventive ingenuity.

Thus, for example, the music may be produced by other music reproducing means or mechanisms such as music drums or boxes or perforated rolls of the nature used in player pianos. It is, of course, also possible to use tape reproducers and the like. As a general proposition it will be appreciated that playback of stored music in any form can be used for the purposes of this invention. Further, instead of battery-operated music reproducing devices it is within the scope of this invention to employ spring-operated wind-up mechanisms, wherein the mechanism is actuated in response to air blown through the mouth piece.

I claim:

1. A child's musical toy comprising, a body simulating a wind-type musical instrument, said body including a hollow portion for housing a battery-operated device for reproducing a continuous tune and a tubular portion at one end open at its outer end; a battery-operated device for reproducing said tune disposed within said hollow portion, said device including a motor and a battery connected in electric circuit with said motor; a normally open switch in said circuits disposed adjacent the inner end of said tubular end portion, said switch including a pair of switch terminals, one of said terminals being resilient and arranged to contact said other terminal to close said switch and maintain it in closed position under continued breath pressure applied through the open end of said tubular portion.

2. The child's musical toy of claim 1 within said battery-operated device comprises a toy phonograph including a turntable and a grooved record mounted on said turntable.

3. The child's musical toy of claim 1, wherein said tubular portion is open at its inner end and said switch is disposed adjacent said inner end with said resilient terminal contiguous thereto and wherein a member is disposed within said tubular portion and movable under breath pressure into contact with said resilient switch terminal to bend the same into contact with said other terminal.

4. The child's musical toy of claim 3, wherein said switch comprises a pair of parallel bars spaced from one another along the longitudinal axis of said tubular portion, each said bar connected by one end into said electric circuits in insulated relation to the other with its other end extending opposite the inner end of said tubular portion; the bar closest to said open end being resiliently flexible and adapted to be bent by said movable member under breath pressure into contact with the other of said bars to close said switch and maintain said switch in closed position under continuous breath pressure.

5. The child's toy of claim 3 wherein said movable member comprises a plug snugly and slidably held in said tubular portion at the inner end thereof.

6. The child's toy of claim 5, wherein a tubular portion of lesser diameter than said first named tubular portion is set into the open end of first tubular portion, said second tubular portion projecting from said first tubular portion and having said mouth piece at its projecting end, and a plug is snugly and slideably fitted therewithin at its other end, said plug adapted to be blown into contact with said resiliently flexible switch bar.

7. The child's toy of claim 6, wherein the inner end of said second tube is in close proximity to said switch and said plug is of a length to have a portion thereof retained within said second tube upon being blown into contact with said resiliently flexible bar of said switch to flex the same.

8. The child's toy of claim 6, wherein a pair of longitudinally spaced parallel plates are provided in said tubular portion inwardly of the open end thereof, the plate nearest said open end having an opening formed therein, the inner end of said second tube fitting into said opening; the free ends of said switch bars extending into the space between said plates in alignment with said opening.

9. The child's toy of claim 8, wherein said plug is formed with a head, said first named head disposed within the space between said plates, whereby said plug is retained in said inner end of said second tube.

10. A toy comprising a housing having the configuration of a wind instrument with a hollow mouth piece, said housing defining an interior space communicating with said mouthpiece, music reproducing means located within said space, actuating means located within said space for actuating said music reproducing means, and normally open switch means operatively connected to said actuating means and being responsive to air blown through said mouthpiece, whereby, when air is blown through said mouth piece, said switch means is closed to actuate said actuating means.

11. A toy as claimed in claim 10 wherein said actuating means comprises a battery and an electric motor.

* * * * *